United States Patent
Byun et al.

(10) Patent No.: US 11,966,110 B2
(45) Date of Patent: Apr. 23, 2024

(54) DISPLAY DEVICE

(71) Applicant: LG ELECTRONICS INC., Seoul (KR)

(72) Inventors: Sangpil Byun, Seoul (KR); Keunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 324 days.

(21) Appl. No.: 17/433,678

(22) PCT Filed: Apr. 15, 2019

(86) PCT No.: PCT/KR2019/004516
§ 371 (c)(1),
(2) Date: Aug. 25, 2021

(87) PCT Pub. No.: WO2020/213749
PCT Pub. Date: Oct. 22, 2020

(65) Prior Publication Data
US 2022/0043294 A1 Feb. 10, 2022

(51) Int. Cl.
*G02F 1/1333* (2006.01)
(52) U.S. Cl.
CPC .. *G02F 1/133322* (2021.01); *G02F 1/133314* (2021.01); *G02F 1/133317* (2021.01)
(58) Field of Classification Search
CPC .................................................. H05K 5/0013
See application file for complete search history.

(56) References Cited

U.S. PATENT DOCUMENTS

| | | | |
|---|---|---|---|
| 10,082,693 B2 | 9/2018 | Son et al. | |
| 2011/0128463 A1 | 6/2011 | Ji et al. | |
| 2011/0261283 A1* | 10/2011 | Kim | H04N 23/57 349/58 |
| 2018/0149903 A1* | 5/2018 | Kim | G02F 1/133308 |
| 2019/0024406 A1* | 1/2019 | Zhang | H01M 50/262 |
| 2019/0064579 A1 | 2/2019 | Kim et al. | |
| 2019/0094602 A1* | 3/2019 | Jung | G02F 1/133603 |

FOREIGN PATENT DOCUMENTS

| | | |
|---|---|---|
| JP | 2014-115313 A | 6/2014 |
| KR | 10-2013-0033571 A | 4/2013 |
| KR | 10-2015-0069802 A | 6/2015 |
| KR | 10-2017-0054102 A | 5/2017 |
| KR | 10-1834350 B1 | 3/2018 |
| KR | 10-2019-0021019 A | 3/2019 |
| KR | 10-2019-0025428 A | 3/2019 |
| KR | 10-2019-0034969 A | 4/2019 |

* cited by examiner

*Primary Examiner* — Mukundbhai G Patel
(74) *Attorney, Agent, or Firm* — Birch, Stewart, Kolasch & Birch, LLP

(57) ABSTRACT

A display device is disclosed. The display device of the present disclosure may comprise a display panel; a guide panel including a vertical portion supporting a rear surface of the display panel, a horizontal portion extending rearward from the vertical portion, and a groove formed on an outer surface of the horizontal portion; and, a back cover including a flat plate positioned at a rear of the guide panel, a side plate extending forward from the flat plate and covering the horizontal portion, and a latch formed on an inner surface of the side plate and caught in the groove.

9 Claims, 11 Drawing Sheets

DISPLAY DEVICE

CROSS REFERENCE TO RELATED APPLICATIONS

This application is the National Phase of PCT/KR2019/004516 filed on Apr. 15, 2019, which is hereby expressly incorporated by reference into the present application.

TECHNICAL FIELD

The present disclosure relates to a display device.

BACKGROUND ART

As the information society develops, the demand for display devices is also increasing in various forms, and in response to this, various display devices such as a liquid crystal display device (LCD), a plasma display panel (PDP), an electroluminescent display (ELD), a vacuum fluorescent display (VFD), and an organic light emitting diode (OLED) have been researched and used.

Among them, a liquid crystal panel of the LCD may include a liquid crystal layer, a TFT substrate and a color filter substrate facing each other with a liquid crystal layer therebetween, and display an image using light provided from a backlight unit.

Recently, research on improving the assembly structure of the display device while securing the rigidity of the display device has been actively conducted.

DETAILED DESCRIPTION OF INVENTION

Technical Problem

The present disclosure aims to solve the above-mentioned problems and other problems. Another object may be to provide a display device capable of simplifying an assembly process.

Another object may be to provide a display device capable of firmly fastening the case member.

Another object may be to provide a display device capable of increasing the convenience of maintenance.

Technical Solution

According to an aspect of the present disclosure in order to achieve the above or other objects, the present disclosure provides a display panel; a guide panel including a vertical portion supporting a rear surface of the display panel, a horizontal portion extending rearward from the vertical portion, and a groove formed on an outer surface of the horizontal portion; and, a back cover including a flat plate positioned at a rear of the guide panel, a side plate extending forward from the flat plate and covering the horizontal portion, and a latch formed on an inner surface of the side plate and caught in the groove.

In addition according to another aspect of the present disclosure, a ratio of an amount of engagement between the groove and the latch to a depth of the groove may be 9:4.5 to 5.5.

In addition according to another aspect of the present disclosure, the latch may include a front surface having a convex curved surface and a rear surface having a concave curved surface.

In addition according to another aspect of the present disclosure, a curvature of the convex curved surface and a curvature of the concave curved surface may be substantially the same.

In addition according to another aspect of the present disclosure, the groove may have a length extending along one side of the display panel and a width extending in a front-rear direction, and a ratio of the length to the width of the groove may be 3:0.5 to 1.5.

In addition according to another aspect of the present disclosure, the latch may include: a first part extending along one side of the display panel; and, a second part extending forward from the first part.

In addition according to another aspect of the present disclosure, the groove may include: a first groove extending along the one side of the display panel; a second groove formed in the first groove and extending along the one side of the display panel; and, a third groove formed in the first groove and extending forward from the second groove.

In addition according to another aspect of the present disclosure, the first part may be received in the second groove, and the second part may be received in the third groove.

In addition according to another aspect of the present disclosure, the display device may further comprise a front cover including a front wall covering a front surface of the display panel and a side wall extending rearward from the front wall and covering the side plate of the back cover.

In addition according to another aspect of the present disclosure, a gap may be formed between the side wall and the side plate.

Advantageous Effects

The effect of the display device according to the present disclosure will be described as follows.

According to at least one of the embodiments of the present disclosure, it is possible to simplify the assembly process of the display device. Accordingly, there are advantages that the manufacturing yield can be increased, and the manufacturing time and manufacturing cost can be reduced.

According to at least one of the embodiments of the present disclosure, it is possible to make the fastening of the case member more firm.

According to at least one of the embodiments of the present disclosure, it is possible to increase the convenience of maintenance.

Additional scope of applicability of the present disclosure will become apparent from the following detailed description. However, various changes and modifications within the spirit and scope of the present disclosure may be clearly understood by those skilled in the art, and thus, it should be understood that specific embodiments, such as the detailed description and preferred embodiments of the present disclosure, are given only by way of illustration.

MODE FOR INVENTION

In the following description, the same or similar elements may be assigned the same reference numerals, and overlapping descriptions with respect to the same reference numbers may be omitted.

In the following description, although embodiments are described with reference to specific drawings, if necessary, reference numerals not appearing in the specific drawings may be referred to, and reference numbers not appearing in the specific drawings are used only when the reference numbers appear in the remaining drawings.

It may be used terms such as first, second, A, B, (a), (b), upper side, lower side used in the following description. These terms are only for distinguishing the elements from other elements, and the essence, order, or sequence of the elements, etc. is not limited by the terms.

The suffixes "module" and "part" for elements used in the following description are given or used interchangeably in consideration of only the ease of writing the specification, and do not have distinct meanings or roles by themselves.

In the following description, when it is described that a first element is 'connected', 'coupled', 'mounted', 'fastened', 'contacted' or 'accessed' to a second element, it is included a case in which a third element is 'connected', 'coupled', 'mounted', 'fastened', 'contacted' or 'accessed' between the first element and the second element, as well as a case in which the first element is directly 'connected', 'coupled', 'mounted', 'fastened', 'contacted' or 'accessed' to the second element.

In the following description, when it is determined that the detailed description of the related art is likely to blur the gist of the embodiment in the present disclosure, a detailed description thereof may be omitted.

In the following description, the accompanying drawings are only for the purpose of easily understanding the embodiments disclosed in the present disclosure, and the technical spirit disclosed in the present disclosure is not limited by the accompanying drawings, it should be understood that the present disclosure include all modifications, equivalents and substitutes included within the spirit and technical scope of the present disclosure.

Terms such as height, length, width, and breadth used in the following description may be used interchangeably for convenience of description, and do not have distinct meanings or roles by themselves.

Hereinafter, a liquid crystal display device (LCD) will be described as an example for a display panel, but the display panel applicable to the present disclosure is not limited to the LCD panel.

Figure 1:
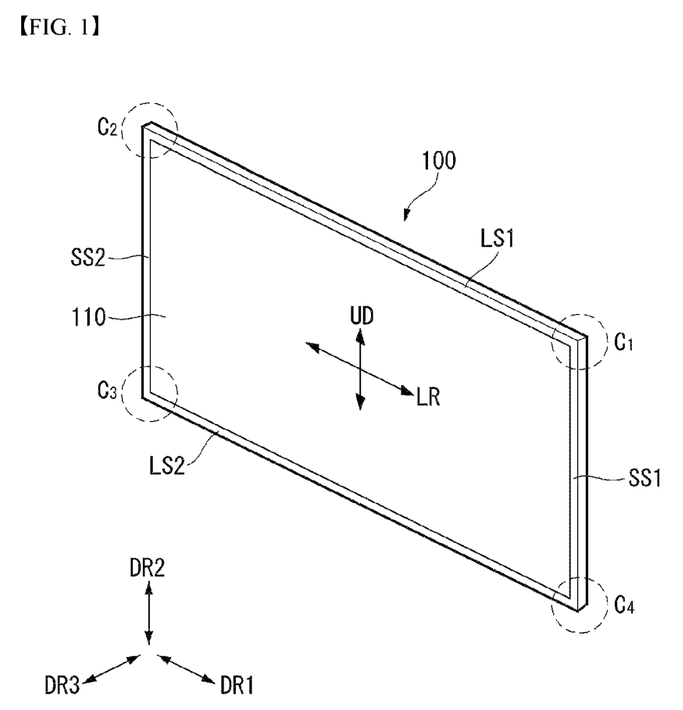
FIGS. 1 to 5 are diagrams illustrating examples of a display device related to the present disclosure.

Referring to FIG. 1, hereinafter, a display device may include a first long side LS1, a second long side LS2 opposite the first long side LS1, a first short side SS1 adjacent to the first long side LS1 and the second long side LS2, and a second short side SS2 opposite the first short side SS1.

Here, it is possible that the first short side area SS1 is referred to as a first side area, the second short side area SS2 is referred to as a second side area opposite the first side area, the first long side area LS1 is referred to as a third side area adjacent to the first side area and the second side area and positioned between the first side area and the second side area, and the second long side area LS2 is referred to as a fourth side area adjacent to the first side area and the second side area and positioned between the first side area and the second side area and opposite the third side area.

In addition, for convenience of description, although lengths of the first and second long sides LS1 and LS2 are longer than lengths of the first and second short sides SS1 and SS2, the lengths of the first and second long sides LS1 and LS2 may be approximately equal to the lengths of the first and second short sides SS1 and SS2.

In addition, hereinafter, a first direction DR1 may be a direction parallel to the long sides LS1 and LS2 of a display panel 100, and a second direction DR2 may be a direction parallel to the short sides SS1 and SS2 of the display panel 100. A third direction DR3 may be a direction perpendicular to the first direction DR1 and/or the second direction DR2.

The first direction DR1 and the second direction DR2 may be collectively referred to as a horizontal direction. In addition, the third direction DR3 may be referred to as a vertical direction.

A direction in which the display device displays an image may be referred to as a forward direction or a front side or front surface. When the display device displays the image, a direction in which the image cannot be observed may be referred to as a rearward direction or a rear side or a rear surface. When the display is viewed from the front direction or the front surface, the first long side LS1 side may be referred to as an upper side or an upper surface. Similarly, the second long side LS2 side may be referred to as a lower side or a lower surface. Similarly, the first short side SS1 side may be referred to as a right side or right surface, and the second short side SS2 side may be referred to as a left side or a left surface.

In addition, the first long side LS1, the second long side LS2, the first short side SS1, and the second short side SS2 may be referred to as edges of the display device. In addition, a point at which the first long side LS1, the second long side LS2, the first short side SS1, and the second short side SS2 meet each other may be referred to as corners. For example, a point where the first long side LS1 meets the first short side SS1 may be a first corner C1, a point where the first long side LS1 meets the second short side SS2 may be a second corner C2, a point where the second short side SS2 meets the second long side LS2 may be a third corner C3, and a point where the second long side LS2 meets the first short side SS1 may be a fourth corner C4.

Here, a direction from the first short side SS1 to the second short side SS1 or a direction from the second short side SS2 to the first short side SS1 may be referred to as a left-right direction LR. A direction from the first long side LS1 to the second long side LS2 or a direction from the second long side LS2 to the first long side LS1 may be referred to as an up-down direction UD.

FIGS. 1 to 5 are diagrams illustrating examples of a display device related to the present disclosure.

Figure 2:
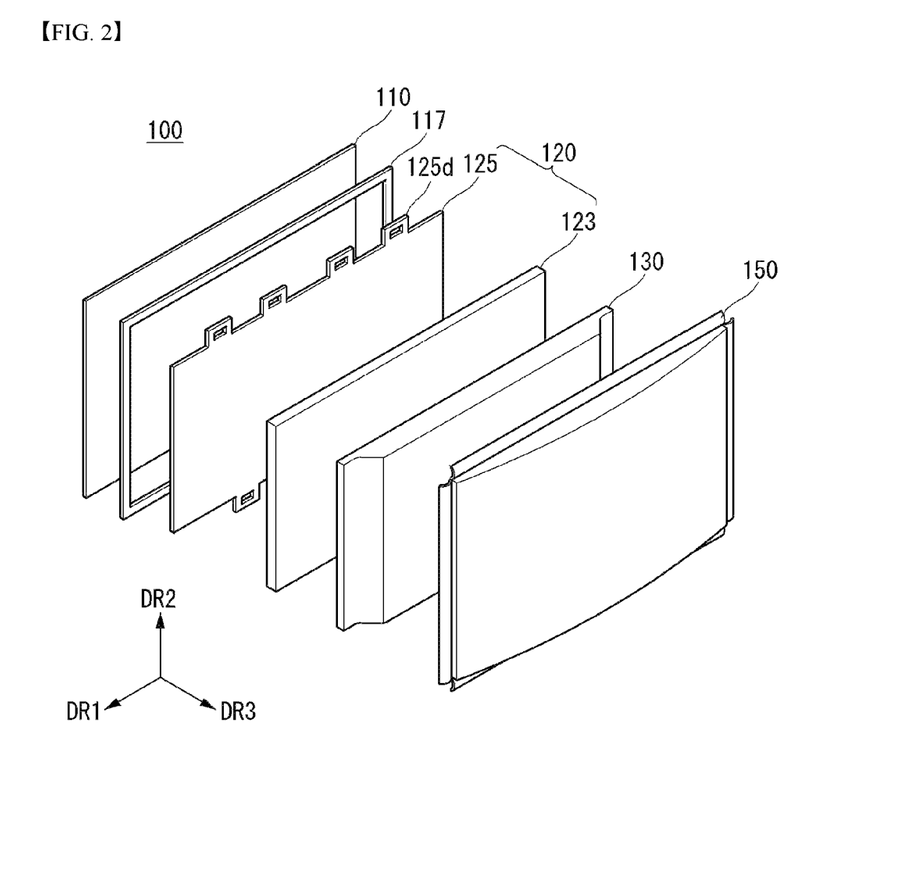

Referring to FIGS. 1 and 2, a display panel 110 is positioned in front of a display device 100 and may display an image. The display panel 110 may include a plurality of pixels to output an image by matching color, brightness, and chroma for each pixel.

The display panel 100 may be divided into an active area displaying an image and an inactive area not displaying an image. The display panel 110 may include a front substrate and a rear substrate facing each other with a liquid crystal layer interposed therebetween.

The front substrate may include a plurality of pixels including red (R), green (G), and blue (B) sub-pixels. The front substrate may generate a color corresponding to red, green, or blue according to a control signal.

The rear substrate may include switching elements. The rear substrate may switch the pixel electrode. For example, the pixel electrode may change the molecular arrangement of the liquid crystal layer according to the control signal applied from the outside. The liquid crystal layer may include a plurality of liquid crystal molecules. The liquid crystal molecules may change their arrangement in response to a voltage difference generated between the pixel electrode and the common electrode. The liquid crystal layer may transmit light provided from a backlight unit 120 to the front substrate.

The guide panel 117 may be positioned at the rear of the display panel 110. The guide panel 117 may support a portion of a rear surface of the display panel 110. The guide panel 117 may be in contact with the outside of the display panel 110. The guide panel 117 may be coupled to a frame 130.

The backlight unit 120 may be positioned at the rear of the display panel 110. The backlight unit 120 may include a plurality of light sources. The light source of the backlight unit 120 may be a direct type or an edge type. In the case of the edge type backlight unit 120, a light guide part or a light guide panel (LGP) may be further included.

The backlight unit 120 may be positioned in a front surface of the frame 130. For example, it means that the plurality of light sources may be disposed on the front surface of the frame 130, and this may be collectively referred to as a direct type backlight unit.

The backlight unit 120 may be driven by a full driving method or a partial driving method such as local dimming, impulsive, or the like. The backlight unit 120 may include an optical sheet 125 and a light source unit 123.

The optical sheet 125 may disperse the light of the light source. The optical sheet 125 may be composed of a plurality of layers. For example, the optical sheet 125 may include at least one prism sheet and/or at least one diffusion sheet.

The optical sheet 125 may include at least one coupling portion 125d. Although not shown, the coupling portion 125d may be coupled to a back cover 150. That is, it means that the coupling portion 125d may be directly coupled to the back cover 150. Alternatively, the coupling portion 125d may be coupled to a structure coupled to the back cover 150. That is, it means that the coupling portion 125d may be indirectly coupled to the back cover 150. Alternatively, the coupling portion 125d may be fixed by a mechanism other than the back cover 150. Alternatively, the coupling portion 125d may be omitted, and in this case, the optical sheet 125 may be seated by another mechanism and fixed at a preset position by an adhesive member or the like.

The light source unit 123 may include a light source or the like. Specific details of the light source unit 123 will be described in the corresponding part.

The frame 130 may support components of the display device 100. For example, the backlight unit 120 may be coupled to the frame 130. The frame 130 may be made of a metal material such as an aluminum alloy.

The back cover 150 may be positioned at the rear of the display device 100. The back cover 150 may protect an internal configuration from the outside. At least a portion of the back cover 150 may be coupled to the frame 130. The back cover 150 may be an injection molding product of a resin material.

The frame 130 and the back cover 150 may be fixed to each other through at least one fastening structure. Details of the fastening structure between the frame 130 and the back cover 150 will be described in the corresponding section.

Figure 3:
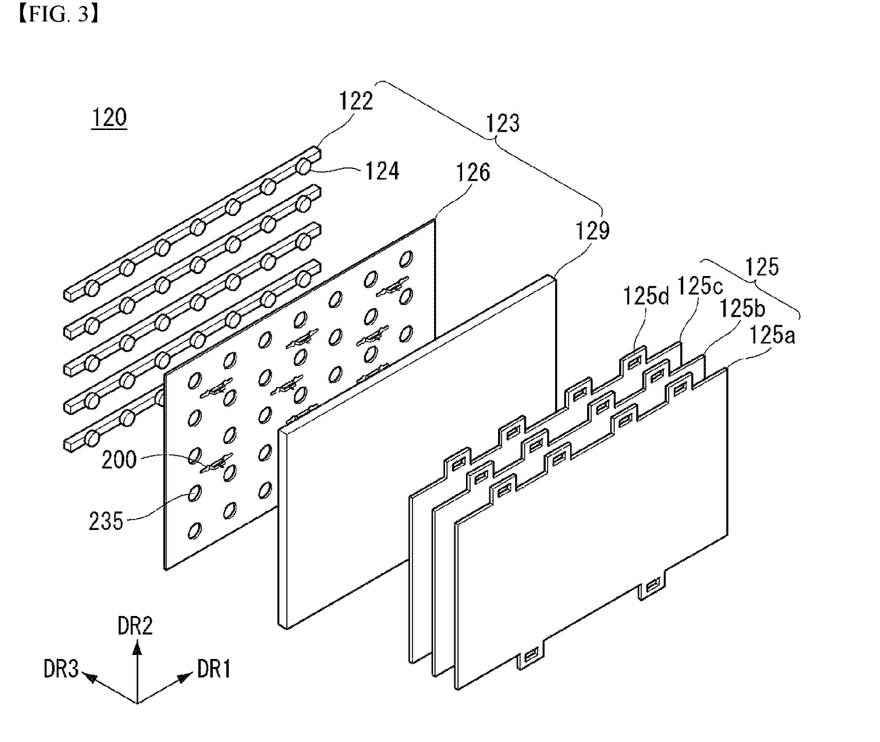

Referring to FIG. 3, the backlight unit 120 may include the light source unit 123 including a substrate 122, at least one optical assembly 124, a reflective sheet 126, and a diffusion plate 129 and the optical sheet 125 positioned in front of the light source unit 123. The configuration of the backlight unit 120 is not limited thereto, and any one or more of them may be omitted.

The substrate 122 may be configured in the form of a plurality of straps extending in a first direction and spaced apart from each other by a predetermined distance in a second direction orthogonal to the first direction.

At least one optical assembly 124 may be mounted on the substrate 122. An electrode pattern for connecting an adapter and the optical assembly 124 may be formed on the substrate 122. For example, the electrode pattern may be a carbon nano tube (CNT) electrode pattern.

The substrate 122 may be made of at least one of polyethylene terephthalate (PET), glass, polycarbonate (PC), and silicon. The substrate 122 may be a printed circuit board (PCB).

The optical assembly 124 may be disposed on the substrate 122 with a predetermined interval in the first direction. A diameter of the optical assembly 124 may be greater than a width of the substrate 122. That is, the diameter of the optical assembly 124 may be greater than the length of the substrate 122 in the second direction.

The optical assembly 124 may be a light emitting diode (LED) chip or a light emitting diode package including at least one light emitting diode chip.

The optical assembly 124 may be a colored LED that emits at least one color among colors such as red, blue, and green or a white LED. The colored LED may include at least one of a red LED, a blue LED, and a green LED.

The light source included in the optical assembly 124 may be a Chip On Board (COB) type. The COB type may be a form in which an LED chip, which is a light source, is directly coupled to the substrate 122. This can simplify the manufacturing process. In addition, it is possible to lower the resistance, thereby reducing the energy lost as heat. That is, it means that the power efficiency of the optical assembly 124 can be increased. The COB type may provide brighter lighting. The COB type may provide a thinner thickness and lighter weight than the conventional one.

The reflective sheet 126 may be positioned on the front surface of the substrate 122. The reflective sheet 126 may have a through hole 235, and the light assembly may be inserted into the through hole 235.

The reflective sheet 126 may reflect the light provided from the optical assembly 124 forward. In addition, the reflective sheet 126 may reflect the light reflected from the diffusion plate 129 back toward the diffusion plate 129.

The reflective sheet 126 may include at least one of metal and metal oxide, which are reflective materials. For example, the reflective sheet 126 may include a metal and/or a metal oxide having a high reflectance such as at least one of aluminum (Al), silver (Ag), gold (Au), and titanium dioxide ($TiO_2$).

The reflective sheet 126 may be formed by depositing and/or coating the metal or the metal oxide on the substrate 122. Ink including a metal material may be printed on the reflective sheet 126. A deposition layer using a vacuum deposition method such as a thermal deposition method, an evaporation method, or a sputtering method may be formed on the reflective sheet 126. A coating layer and/or a printed layer using a printing method, a gravure coating method, or a silk screen method may be formed on the reflective sheet 126.

An air gap may be positioned between the reflective sheet 126 and the diffusion plate 129. The air gap may serve as a buffer through which light emitted from the optical assembly 124 may be widely spread. In order to maintain the air gap, a supporter 200 may be positioned between the reflective sheet 126 and the diffusion plate 129.

A resin may be deposited on the optical assembly 124 and/or the reflective sheet 126. The resin may diffuse light emitted from the optical assembly 124. The diffusion plate 129 may diffuse light emitted from the optical assembly 124 upward.

The optical sheet 125 may be positioned in front of the diffusion plate 129. The rear surface of the optical sheet 125 may face the diffusion plate 129, and the front surface of the optical sheet 125 may face the rear surface of the display panel 110.

The optical sheet 125 may include at least one sheet. Specifically, the optical sheet 125 may include one or more prism sheets and/or one or more diffusion sheets. The plurality of sheets included in the optical sheet 125 may be in a state of being adhered and/or in close contact.

The optical sheet 125 may be composed of a plurality of sheets having different functions. For example, the optical sheet 125 may include first to third optical sheets 125a to 125c. The first optical sheet 125a may function as a diffusion sheet, and the second and third optical sheets 125b and 125c may function as a prism sheet. The number and/or position of the diffusion sheet and the prism sheet may be changed.

The diffusion sheet prevents light emitted from the diffusion plate from being partially concentrated, thereby making light distribution more uniform. The prism sheet may collect light emitted from the diffusion sheet so that the light is vertically incident on the display panel 110.

The coupling portion 125d may be formed on at least one of one side or an edge of the optical sheet 125. The coupling portion 125d may be formed on at least one of the first to third optical sheets 125a to 125c.

The coupling portion 125d may be formed on a long side or an edge of the optical sheet 125. The coupling portion 125d formed on the first long side and the coupling portion 125d formed on the second long side may be asymmetric. For example, it means that the positions and/or the number of the coupling portion 125d of the first long side and the coupling portion 125d of the second long side may be different from each other.

Figure 4:
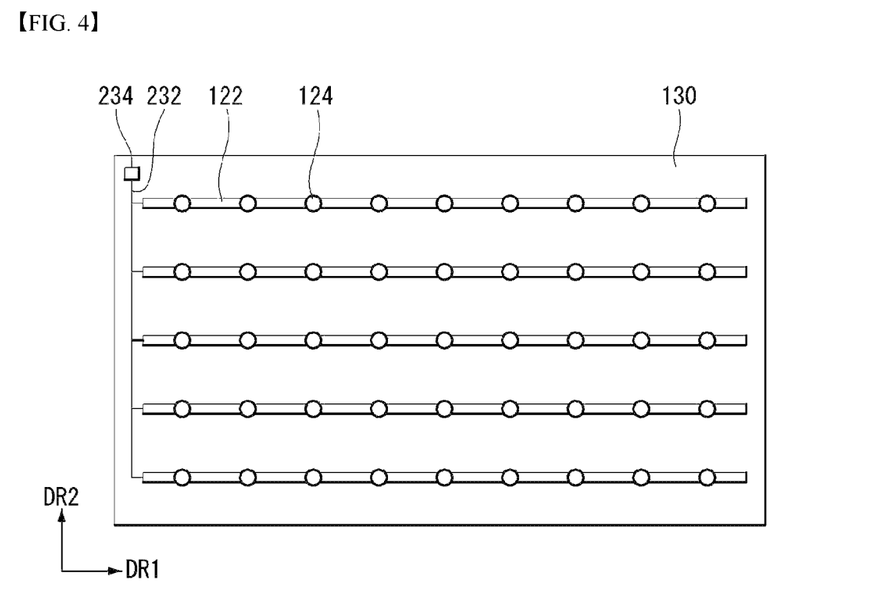

Referring to FIG. 4, the substrate 122 including a plurality of straps extending in the first direction and spaced apart from each other by a predetermined distance in the second direction orthogonal to the first direction may be provided on the frame 130. One end of the plurality of substrates 122 may be connected to a wiring electrode 232.

The wiring electrode 232 may extend in the second direction. The wiring electrode 232 may be connected to one side of the substrate 122 at regular intervals in the second direction.

A wiring hole 234 may be formed at one end of the wiring electrode 232. The wiring hole 234 may be a fine hole passing through the frame 130. Through the wiring hole 234, the wiring electrode 232 may extend to the a rear surface of the frame 130. Through the wiring hole 234, the wiring electrode 232 may be electrically connected to an adaptor (not shown) positioned on the rear surface of the frame 130.

The optical assembly 124 may be mounted on the substrate 122 with a predetermined interval in the first direction. A diameter of the optical assembly 124 may be greater than a width of the substrate 122 in the second direction.

Figure 5:
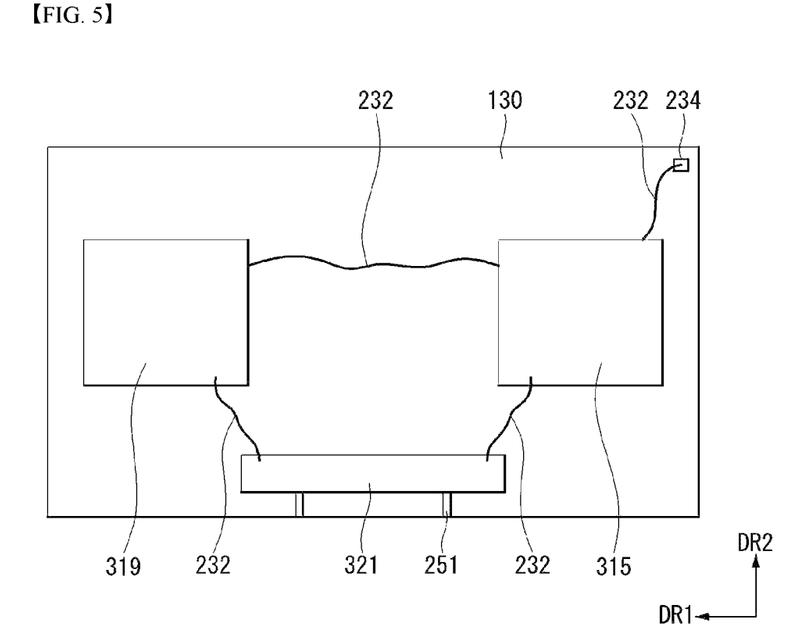

Referring to FIG. 5, the wiring electrode 232 extending from the front surface of the frame 130 through the wiring hole 234 may be electrically connected to a power supply 315. The power supply 315 may be a printed circuit board that supplies power to the display device 100. The power supply 315 may change AC power to DC power.

The power supply 315 may supply a current to the optical assembly 124 through the wiring electrode 232. The power supply 315 may be electrically connected to a main board 321 through the wiring electrode 232. The main board 321 may be spaced apart from the power supply 315 by a predetermined interval.

The main board 321 may be a printed circuit board that provides an interface for the display device 100 to operate. Also, the main board 321 may check and manage operation states of each component of the display device 100.

The main board 321 and the power supply 315 may be electrically connected to a T-con board 319 through the wiring electrode 232. The T-con board 319 may be a printed circuit board that transmits power or a signal input from the main board 321 or the power supply 315 to the display panel 110. The T-con board 319 may be electrically connected to the display panel 110 on the front surface of the frame 130 through a flat flex cable (FFC) 251.

Each of the printed circuit boards are illustrated as being connected to each other, but it is not limited thereto, and only at least a portion of each of the printed circuit boards may be connected to each other.

Figure 6:
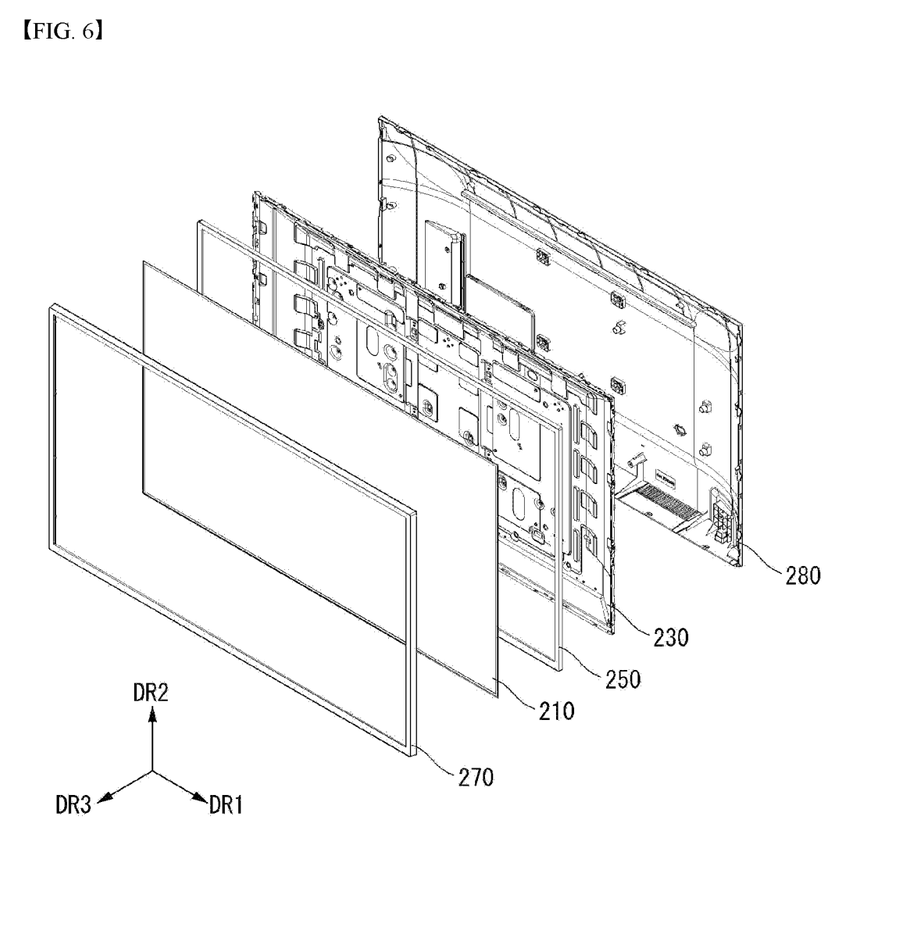
FIGS. 6 to 13 are diagrams illustrating configuration examples of display devices according to embodiments of the present disclosure.

Referring to FIG. 6, a frame 230 may be positioned at a rear of a display panel 210. A guide panel 250 may be fixed to the frame 230, and the display panel 210 may be supported or fixed to the guide panel 250. A back cover 280 may be positioned at the rear of the frame 230. A front cover 270 may be coupled or fixed to at least one of the guide panel 250, the frame 230, and the back cover 280. The display panel 210 may be supported or fixed between the front cover 270 and the guide panel 250.

Figure 7:
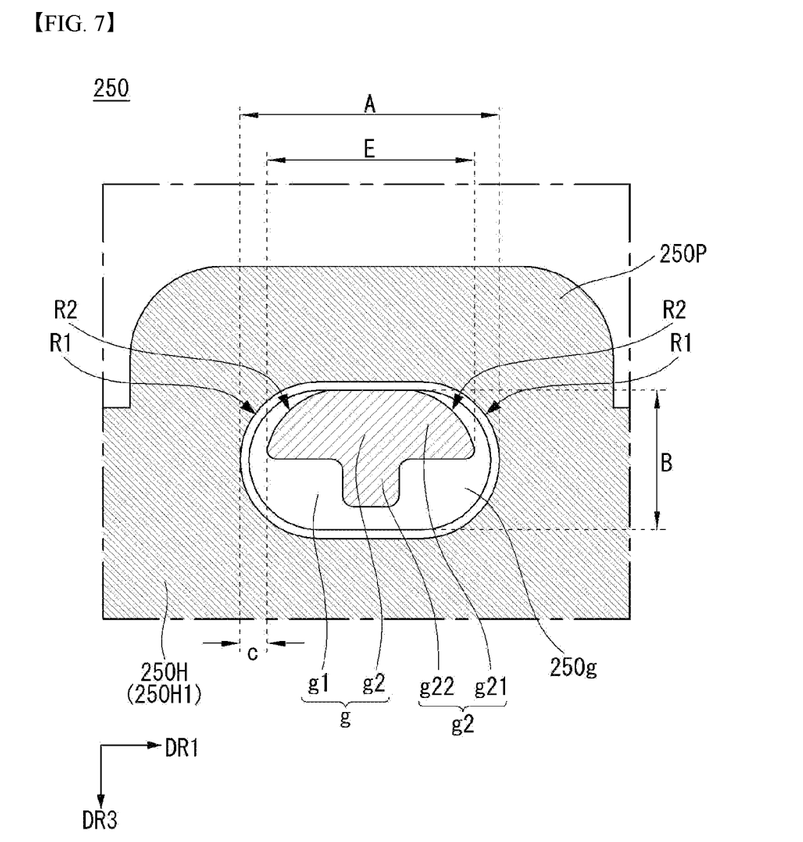

Referring to FIG. 7, a groove g may be formed in a protrusion 250P of a horizontal portion 250H of the guide panel 250. The groove g may be referred to as a hole g, a fastening portion g, a coupling portion g, or a fixing portion g. The groove g may be formed in a direction opposite to the second direction DR2. The groove g may include a first groove g1 and a second groove g2. The second groove g2 may be formed in a direction opposite to the second direction DR2 from the first groove g1. Alternatively, the groove g may pass through the guide panel 250.

The first groove g1 may be formed on a horizontal surface 250H1 of the horizontal portion 250H. The first groove g1 may form a groove surface 250g that is spaced apart from the horizontal surface 250H1 in the second direction DR2. The second groove g2 may be formed on the groove surface 250g.

The first groove g1 may have a circular or elliptical shape when viewed in a direction parallel to the second direction DR2. The first groove g1 may have a length A in the first direction DR1 and a length B in the second direction DR2. For example, A may be 9 mm, and B may be 3 mm. For example, A:B may have a ratio of 3:1. Alternatively, for example, A:B may have a ratio of 3:0.5 to 1.5.

The second groove g2 may have a T-shape when viewed in a direction parallel to the second direction DR2. The second groove g2 may have a length E in the first direction DR1, and may have a length smaller than the length B in the second direction DR2. For example, E may be 8 mm. For example, A:E may have a ratio of 9:8. Alternatively, for example, A:E may have a ratio of 9:7.5 to 8.5.

Along the first direction DR1, a distance C between one side of the first groove g1 and one side of the second groove g2 adjacent to the one side of the first groove g1 may be 0.5 mm. For example, A:C may be 18:1. Alternatively, for example, A:C may be 18:0.5 to 1.5.

The second groove g2 may include a third groove g21 extending along the first direction DR1 and a fourth groove g22 extending along the third direction DR3 from the third groove g21. The first groove g1 may include a first round portion R1, and the fourth groove g22 may include a second round portion R2 bent along the first round portion R1. A curvature of the second round portion R2 may be greater than a curvature of the first round portion R1. For example, a radius of curvature of the second round portion may be 1.5 mm. For example, E:R1 may be 16:3.

Figure 8:
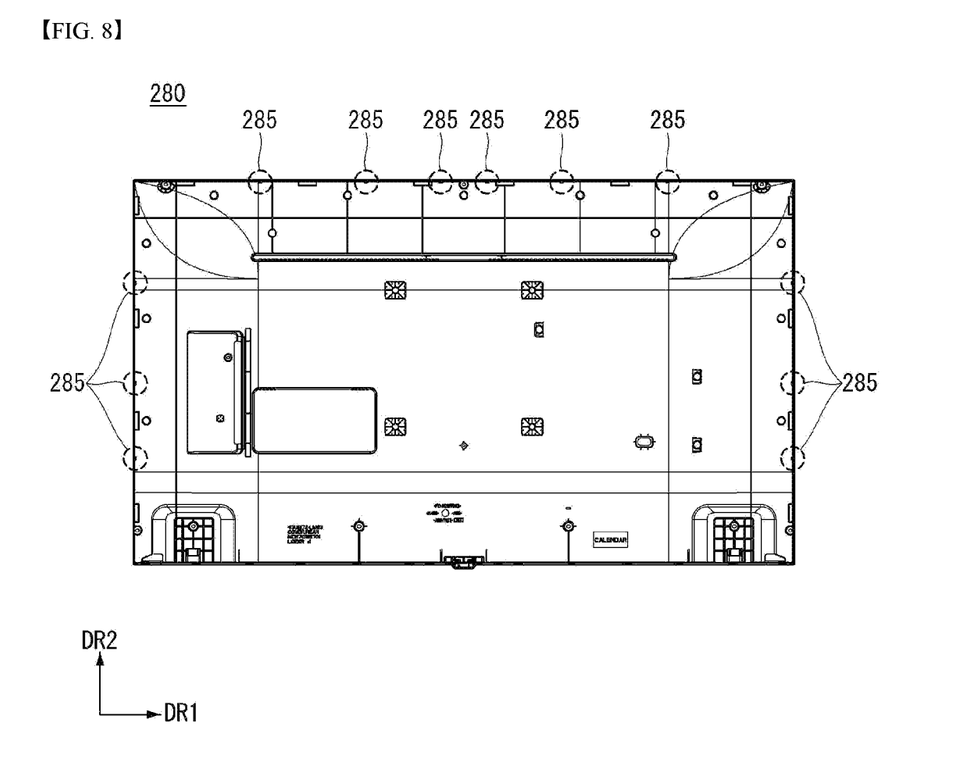

Referring to FIG. 8, a latch 285 may be formed on the back cover 280. The latch 285 may be referred to as a coupling portion 285, a protrusion portion 285, a fixing portion 285, a protrusion 285, a hook 285, or a fastening portion 285. A plurality of latches 285 may be formed. The plurality of latches 285 may be formed along the first short side, the first long side, and the second short side of the back cover 280, and may be spaced apart from each other. The latch 285 may not be formed on the second long side of the back cover 280.

Figure 9:
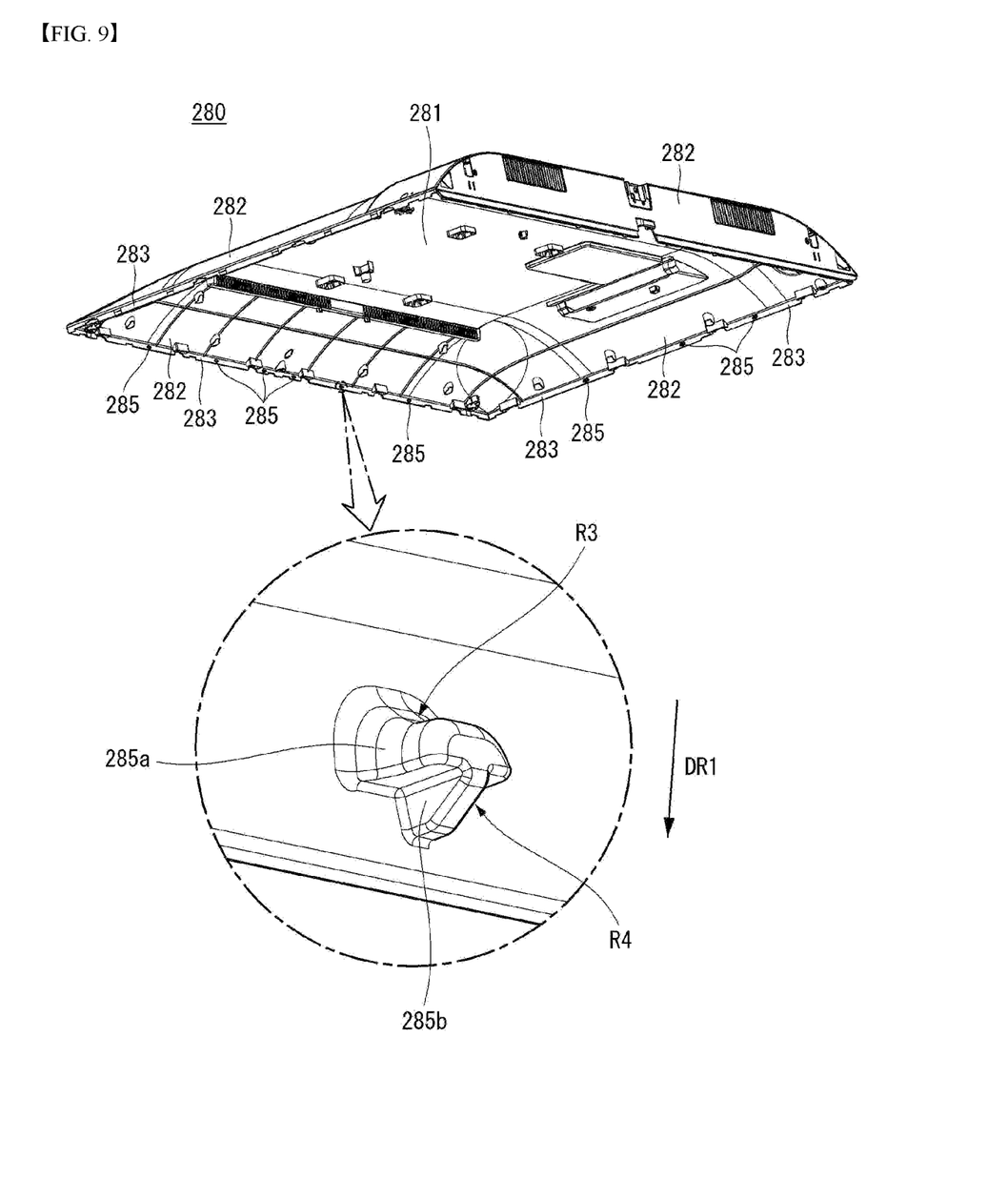

Referring to FIG. 9, the back cover 280 may include a flat plate portion 281 covering the frame 230, an inclined portion 282 extending forward from the flat plate portion 281 and inclined with respect to the flat plate portion 281, and a horizontal portion 283 extending forward from the inclined portion 282. The latch 285 may be formed on an inner surface of the horizontal portion 283. The flat plate portion 281, the inclined portion 282, and the horizontal portion 283 may form an inner space, and the latch 285 may be positioned in the inner space. Alternatively, the latch 285 may protrude from the inner surface of the horizontal portion 283 toward an inner side of the back cover 280. The flat plate portion 281 may be referred to as a back plate 281. The inclined portion 282 and the horizontal portion 283 may be collectively referred to as a side plate.

The latch 285 may include a first part 285a extending along the longitudinal direction of one side of the back cover 280 and a second part 285b extending forward from the first part 285a. The latch 285 may have a T-shape. A direction in which the first part 285a extends and a direction in which the second part 285b extends may be perpendicular to each other. The first part 285a may include a first round portion R3. The first round portion R3 may be an inclined surface having a curved surface. For example, a radius of curvature of the first round portion R3 may be 1 mm. The latch 285 may have a shape that becomes smaller toward the inside of the back cover 280. Alternatively, the latch 285 may have a shape that becomes sharper toward the inside of the back cover 280.

For example, a radius of curvature of a second round portion R4 may be 1 mm. Alternatively, the radius of curvature of the first round portion R3 and the radius of curvature of the second round portion R4 may be the same. Alternatively, the first round portion R3 may have a concave curved surface, and the second round portion R4 may have a convex curved surface.

Figure 10:
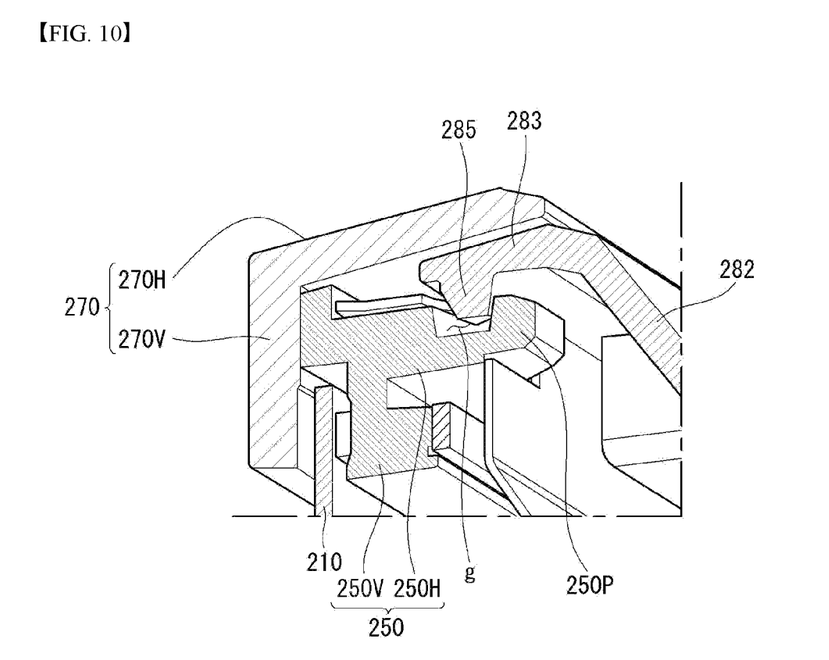

Referring to FIG. 10, the horizontal portion 283 of the back cover 280 may be coupled or fastened to the horizontal portion 250H of the guide panel 250. The latch 285 may be inserted, coupled, or fastened to the groove g or caught in the groove g. The front cover 270 may include a vertical portion 270V and a horizontal portion 270H extending rearward from the vertical portion 270V. The vertical portion 270V may cover the front surface of the display panel 210. The horizontal portion 270H may cover the guide panel 250 or the horizontal portion 283. The guide panel 250 includes the horizontal portion 250H coupled to the horizontal portion 283 of the back cover 280 and a vertical portion 250V extending in a direction opposite to the second direction DR2 from the horizontal portion 250H. The display panel 210 may be fixed between the vertical portions 270V and 250V. The first part 285a may be accommodated in the third groove g21. The second part 285b may be accommodated in the fourth groove g22.

Figure 11:
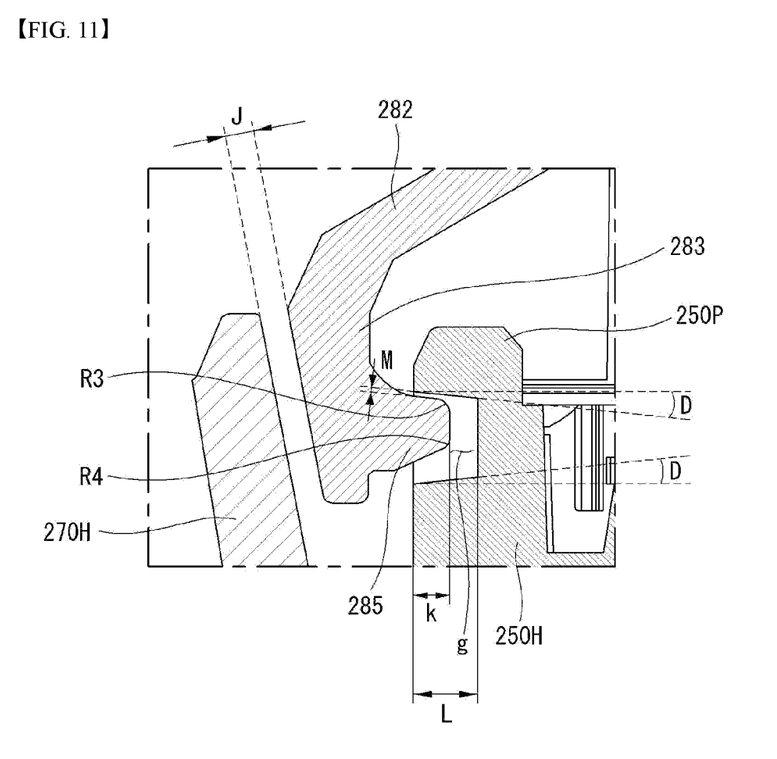

Referring to FIG. 11, the groove g may have a depth L. The latch 285 may engage with the groove g. The groove g may be formed with an angle D. For example, the angle D may be 8 degrees. The latch 285 and the groove g may be engaged by the engagement amount K. For example, L may be 1.8 mm, and K may be 1 mm. For example, L:K may have a ratio of 9:5. Alternatively, for example, L:K may have a ratio of 9:4 to 6.

When the latch 285 engages with the groove g, the first round portion R3 and the horizontal portion 250H of the guide panel 250 may be spaced apart by a distance M. For example, the distance M may be 0.2 mm. When the latch 285 engages with the groove g, the second round portion R4 and the horizontal portion 250H of the guide panel 250 may be spaced apart. When the latch 285 engages with the groove g, the horizontal portions 250H and 270H may be spaced apart from each other by a distance J. For example, the distance J may be 0.5 mm. For example, M:J may have a ratio of 2:5. Alternatively, for example, M:J may have a ratio of 2:4 to 6.

Figure 12:
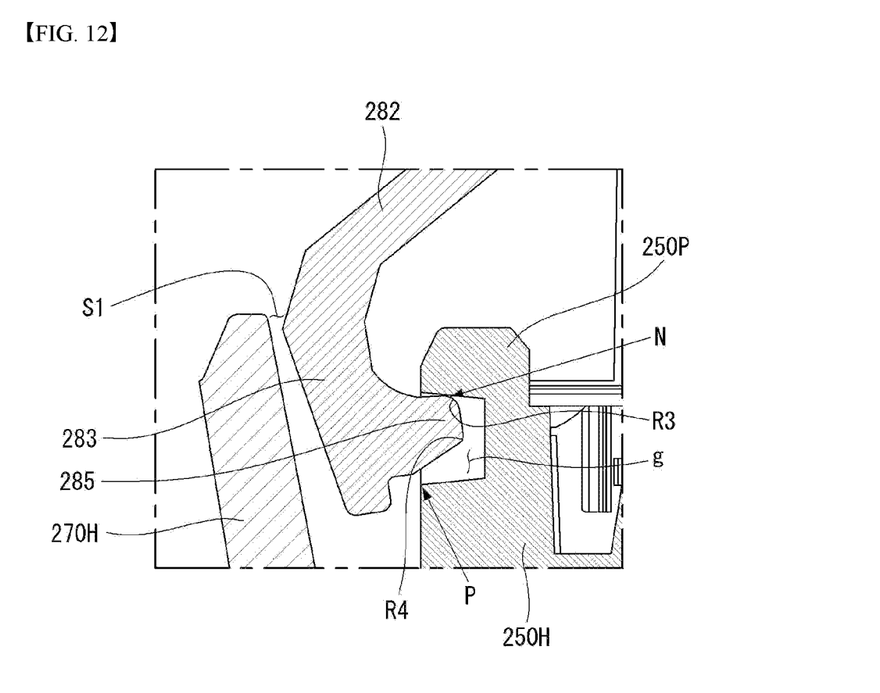

Referring to FIG. 12, the fastening between the back cover 280 (refer to FIG. 9) and the guide panel 250 may be partially released. As the back cover 280 (refer to FIG. 9) is tilted, the first round portion R3 may be in contact (N) with the horizontal portion 250H, the second round portion R4 may form a gap P with the horizontal portion 250H, and may be spaced apart from the horizontal portion 250H, and the horizontal portion 283 may form a gap S1 and may be spaced apart from the horizontal portion 270H of the front cover 270 (refer to FIG. 10).

Figure 13:
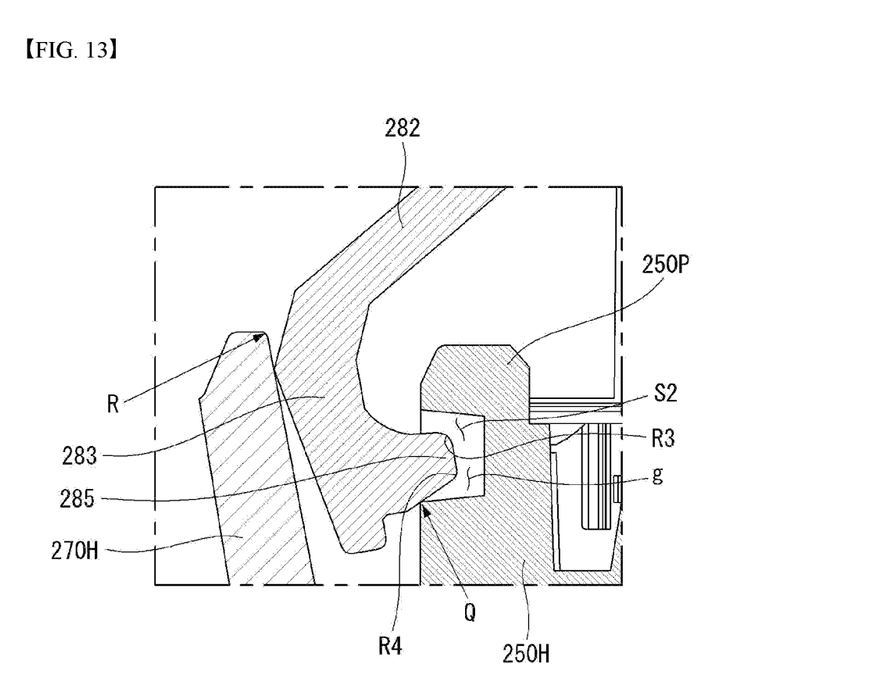

Referring to FIG. 13, the fastening between the back cover 280 and the guide panel 250 may be in a more released state than that described with reference to FIG. 12. As the back cover 280 (see FIG. 9) is tilted, the first round portion R3 may be spaced apart from the horizontal portion 250H by forming a gap S2, and the second round portion R4 may be in contact Q with the horizontal portion 250H. The horizontal portion 283 may be in contact R with the horizontal portions 250H and 270H of the front cover 270 (refer to FIG. 10). Most of the restraints between the back cover 280 and the guide panel 250 are released, and the back cover 280 may be separated from the guide panel 250 thereafter.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
   a display panel;
   a guide panel including a vertical portion supporting a rear surface of the display panel, a horizontal portion extending rearward from the vertical portion, and a groove formed on an outer surface of the horizontal portion; and,
   a back cover including a flat plate positioned at a rear of the guide panel, a side plate extending forward from the flat plate and covering the horizontal portion, and a latch formed on an inner surface of the side plate and caught in the groove,
   wherein the latch includes:
   a first part extending along one side of the display panel; and
   a second part extending forward from the first part in a direction toward the display panel, the second part being perpendicular to the first part, and
   wherein the first part of the latch is disposed closer to the flat plate of the back cover than the second part of the latch.

2. The display device of claim 1, wherein a ratio of an amount of engagement between a depth of the groove and an engagement length of the latch within the groove is L:K, where L is 9 and K is 4.5 to 5.5.

3. The display device of claim 1, wherein the latch includes a front surface having a convex curved surface and a rear surface having a concave curved surface.

4. The display device of claim 3, wherein a curvature of the convex curved surface and a curvature of the concave curved surface are substantially the same.

5. The display device of claim 1, wherein the groove has a length extending along one side of the display panel and a width extending in a front-rear direction, and
   a ratio of the length to the width of the groove is A:B, where A is 3 and B is 0.5 to 1.5.

6. The display device of claim 1, wherein the groove includes:
   a first groove extending along the one side of the display panel;
   a second groove formed in the first groove and extending along the one side of the display panel; and,
   a third groove formed in the first groove and extending forward from the second groove.

7. The display device of claim 6, wherein the first part is received in the second groove, and
   the second part is received in the third groove.

8. The display device of claim 1, further comprising:
   a front cover including:
   a front wall covering a front surface of the display panel and
   a side wall extending rearward from the front wall and covering the side plate of the back cover.

9. The display device of claim 8, wherein a gap is formed between the side wall and the side plate.

* * * * *